(12) United States Patent
Dutta Bordoloi et al.

(10) Patent No.: US 11,001,272 B2
(45) Date of Patent: May 11, 2021

(54) APPARATUS TO ENABLE USER DRIVEN RANGE AND FEATURE SELECTION

(71) Applicant: GM Global Technology Operations LLC, Detroit, MI (US)

(72) Inventors: Unmesh Dutta Bordoloi, Bloomfield Hills, MI (US); Shige Wang, Northville, MI (US); Xinyu Du, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 207 days.

(21) Appl. No.: 16/267,965

(22) Filed: Feb. 5, 2019

(65) Prior Publication Data

US 2020/0247428 A1    Aug. 6, 2020

(51) Int. Cl.
*B60W 50/08* (2020.01)
*B60R 16/03* (2006.01)
*G06F 9/451* (2018.01)
*G01C 21/34* (2006.01)
*G05D 1/00* (2006.01)
*B60R 16/023* (2006.01)

(52) U.S. Cl.
CPC ........... *B60W 50/082* (2013.01); *B60R 16/03* (2013.01); *B60R 16/023* (2013.01); *B60W 2420/42* (2013.01); *B60W 2540/215* (2020.02); *B60W 2556/60* (2020.02); *G01C 21/34* (2013.01); *G05D 1/0088* (2013.01); *G06F 9/451* (2018.02)

(58) Field of Classification Search
CPC ......... B60W 50/082; B60W 2540/215; B60W 2556/60; B60W 2420/42; B60W 2510/305; B60W 2710/305; B60W 2050/146; B60W 2510/244; B60W 10/30; B60W 50/14; B60W 60/0023; B60W 10/26; B60R 16/03; B60R 16/023; G06F 9/451; G01C 21/34; G05D 1/0088; H02J 7/00

See application file for complete search history.

(56) References Cited

U.S. PATENT DOCUMENTS

| | | | | |
|---|---|---|---|---|
| 2013/0304514 | A1* | 11/2013 | Hyde | G06Q 40/08 705/4 |
| 2015/0032321 | A1* | 1/2015 | Wimmer | G05G 1/08 701/23 |
| 2017/0066429 | A1* | 3/2017 | Ogawa | B60W 10/06 |
| 2017/0334454 | A1* | 11/2017 | Abe | G05D 1/0088 |

(Continued)

*Primary Examiner* — Mary Cheung
(74) *Attorney, Agent, or Firm* — Quinn IP Law

(57) ABSTRACT

A method for controlling a vehicle includes: receiving, by a controller, route data, wherein the route data is continuously updated while the vehicle is moving, and the vehicle includes a plurality of vehicle operating modes; receiving, by the controller, feature data, wherein the feature data is information about a plurality of features needed for each of the plurality of vehicle operating modes; determining, by the controller, a plurality of ranges for each of the plurality of vehicle operating modes, wherein each of the plurality of ranges is a function of the route data and the feature data for each of the plurality of vehicle operating modes; and commanding, by the controller, a user interface to display a list of range-mode combinations, wherein the list of range-mode combinations includes the plurality of ranges for each of the plurality of vehicle operating modes.

13 Claims, 6 Drawing Sheets

(56) References Cited

U.S. PATENT DOCUMENTS

| | | | | |
|---|---|---|---|---|
| 2018/0120117 A1* | 5/2018 | Grein | .................... | G01C 21/343 |
| 2019/0025842 A1* | 1/2019 | Kim | ..................... | G05D 1/0061 |
| 2019/0349858 A1* | 11/2019 | Jantzi | .................... | H04W 76/28 |
| 2020/0124426 A1* | 4/2020 | Beaurepaire | ........ | G01C 21/3423 |
| 2020/0139992 A1* | 5/2020 | Oba | ...................... | B60W 30/18 |

* cited by examiner

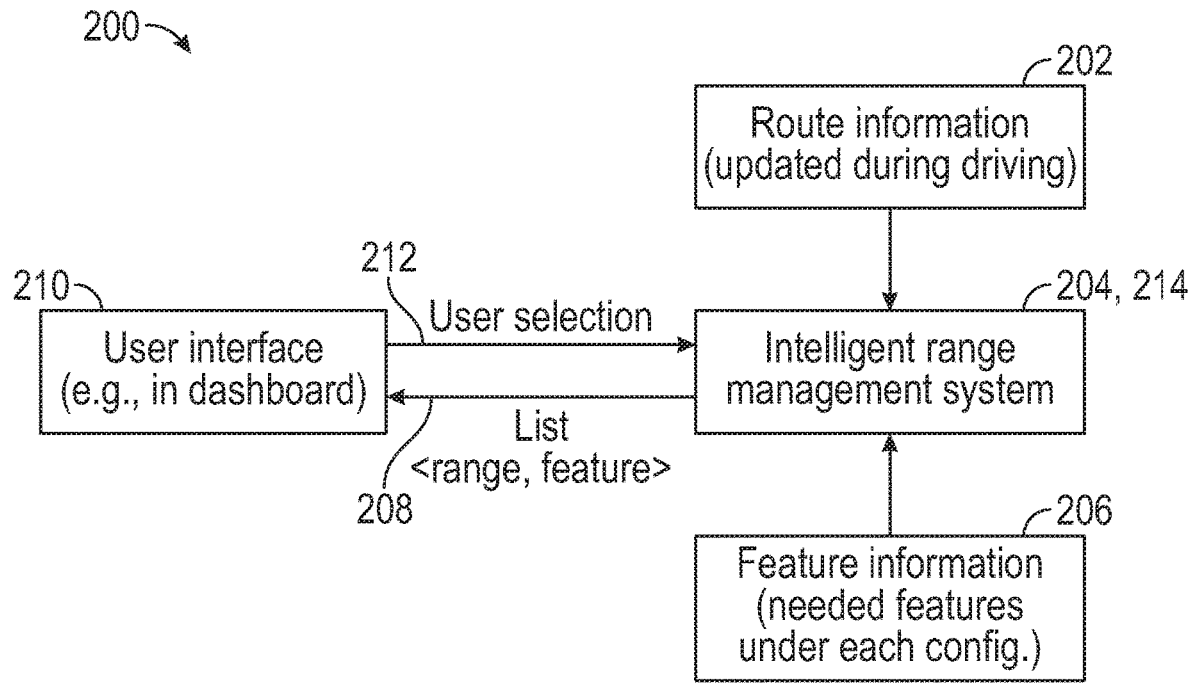

| Feature | Cpu | Gpu | Fpga | mem |
|---|---|---|---|---|
| Obj detect | .02 | .3 | .5 | 3000 |
| Sign detect | .01 | .1 | .2 | 200 |
| Sur. view | .03 | .5 | .1 | 4000 |
| ... | ... | ... | ... | ... |

FIG. 6

APPARATUS TO ENABLE USER DRIVEN RANGE AND FEATURE SELECTION

The present disclosure relates to an apparatus to enable user driven range and feature selection.

Computing and sensing resources for autonomous vehicles consume significant power, which in turn adversely impacts the range of the electric vehicle.

SUMMARY

The present disclosure describes a system with associated infrastructure that enables the vehicle operator to make an informed decision on his or her choice between the range and feature availability.

In one aspect of this disclosure, the method for controlling a vehicle includes: receiving, by a controller, route data, wherein the route data is continuously updated while the vehicle is moving, and the vehicle includes a plurality of vehicle operating modes; receiving, by the controller, feature data, wherein the feature data is information about a plurality of features needed for each of the plurality of vehicle operating modes; determining, by the controller, a plurality of ranges for each of the plurality of vehicle operating modes, wherein each of the plurality of ranges is a function of the route data and the feature data for each of the plurality of vehicle operating modes; and commanding, by the controller, a user interface to display a list of range-mode combinations, wherein the list of range-mode combinations includes the plurality of ranges for each of the plurality of vehicle operating modes.

The method may further include receiving, by the controller, a user input through the user interface. The user input is a selection made by a user of the vehicle that is indicative of a selected range-mode combination of the list of range-mode combinations, and the selected range-mode combination includes a selected range and a selected vehicle operating mode.

The controller is part of a control system. The control system includes a plurality of devices. Each of the plurality of devices is an electric hardware component that consumes electric power. The plurality of devices is selected from a group consisting of a central processing unit, a graphics processing unit, and a field-programable gate array, the plurality of devices includes a plurality of irrelevant devices and a plurality of relevant devices for each of the plurality of vehicle operating modes. The irrelevant devices do not need to be active for a respective one of the vehicle operating modes. The of relevant devices needs to be active for the respective one of the vehicle operating modes.

The method may further include deactivating, by the controller, the plurality of irrelevant devices for the selected vehicle operating mode in response to receiving the user input through the user interface to minimize usage of computational resources of the vehicle. The method may further include determining, by the controller, the plurality of irrelevant devices for the selected vehicle operating mode before deactivating the plurality of irrelevant devices.

The method may further include adjusting a power supply of at least one of the relevant devices for the selected vehicle operating mode to minimize power consumption in response to receiving the user input through the user interface to minimize power consumption. Deactivating a plurality of irrelevant devices includes deactivating modules. Each of the modules includes the plurality of devices. The method may further include determining which modules to deactivate using the following equations:

$$N = \min \|M\| : M\{M_i\}$$

$$\sum_{f \in feature} U(d) \le \sum_{i=1}^{N} M_i(d) : d \in \{cpu, gpu, fpga, mem\}$$

where:

f is a set of features required for the selected vehicle operating mode SVOM.

N represents a minimum number of modules needed for a feature f needed to enable the selected vehicle operating mode SVOM.

M is a set of all modules.

d represents devices inside one of the module.

U is a computing workload that the feature f introduced on device d.

The power consumption of each module may be calculated using the following equation:

$$P = C_1 \cdot V^2 + C_2 \cdot F \cdot V^2$$

where:

$C_1$ is a first constant determined by physical characteristics of a device d.

$C_2$ is a second constant determined by physical characteristics of the device d.

V is a voltage of the device d.

F is a frequency of the device d.

P is power consumed by a module M.

The present disclosure also describes a vehicle. The vehicle includes a control system including a controller, and a sensor system in electric communication with the controller. The controller is programmed to: receive route data, wherein the route data is continuously updated while the vehicle is moving, and the vehicle includes a plurality of vehicle operating modes; receive feature data, wherein the feature data is information about a plurality of features needed for each of the plurality of vehicle operating modes; determine a plurality of ranges for each of the plurality of vehicle operating modes, wherein each of the plurality of ranges is a function of the route data and the feature data for each of the plurality of vehicle operating modes; command a user interface to display a list of range-mode combinations, wherein the list of range-mode combinations includes the plurality of ranges for each of the plurality of vehicle operating modes.

The sensor system may include a plurality of sensor devices. The sensor devices include an optical camera. The sensor devices include a Global Positioning System (GPS) transceiver. The vehicle may further include a user interface configured to receive user inputs. The controller may be programmed to receive a user input through the user interface. The user input is a selection made by a user of the vehicle that is indicative of a selected range-mode combination of the list of range-mode combinations. The selected range-mode combination includes a selected range and a selected vehicle operating mode.

The control system may include a plurality of devices. Each of the plurality of devices is an electric hardware component that consumes electric power, the plurality of devices is selected from a group consisting of computing elements like a central processing unit, a graphics processing unit, a field-programmable gate array and others. The devices include a plurality of irrelevant devices and a plurality of relevant devices for each of the plurality of vehicle operating modes. The plurality of irrelevant devices does not need to be active for a respective one of the plurality of vehicle operating modes and, the plurality of relevant devices need to be active for the respective one of the plurality of vehicle operating modes. The controller may be programmed to deactivate the plurality of irrelevant devices for the selected vehicle operating mode in response to receiving the user input through the user interface to minimize usage of computational resources of the vehicle. The controller may be programmed to determine the plurality of irrelevant devices for the selected vehicle operating mode before deactivating the plurality of irrelevant devices. Each of the vehicle operating modes includes an automation level as defined under a Society of Automotive Engineers (SAE) J 3016-2018 standard. Note that other features may also define a vehicle mode including options within automation level as well as features not related to automation such as the choice of climate control. The controller may be programmed to adjust a power supply of at least one of the relevant devices for the selected vehicle operating mode to minimize power consumption in response to receiving the user input through the user interface to minimize power consumption.

The controller may be programmed to deactivate the plurality of irrelevant devices by deactivating modules. Each of the modules includes the plurality of devices. The controller may be further programmed to determine which modules to deactivate using the following equations:

$$N = \min\{\|M\| : M\{M_i\}$$

$$\sum_{f \in feature} U(d) \le \sum_{i=1}^{N} M_i(d) : d \in \{cpu, gpu, fpga, mem\}$$

where:

f is a set of features required for the selected vehicle operating mode SVOM.

N represents a minimum number of modules needed for a feature f needed to enable the selected vehicle operating mode SVOM.

M is a set of all modules.

d represents devices inside one of the module M.

U is a computing workload that the feature f introduced on device d.

The power consumption of each module may be calculated using the following equation:

$$P = C_1 \cdot V^2 + C_2 \cdot F \cdot V^2$$

where:

$C_1$ is a first constant determined by physical characteristics of the device d.

$C_2$ is a second constant determined by physical characteristics of the device d.

V is a voltage of the device d.

F is a frequency of the device d.

P is power consumed by a module M.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 2 is a block diagram of a method for controlling the vehicle of FIG. 1.

FIG. 3 is a list of range-feature combinations.

FIG. 6 is an example of a resource demand table.

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein is merely exemplary embodiments of the present disclosure.

The connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
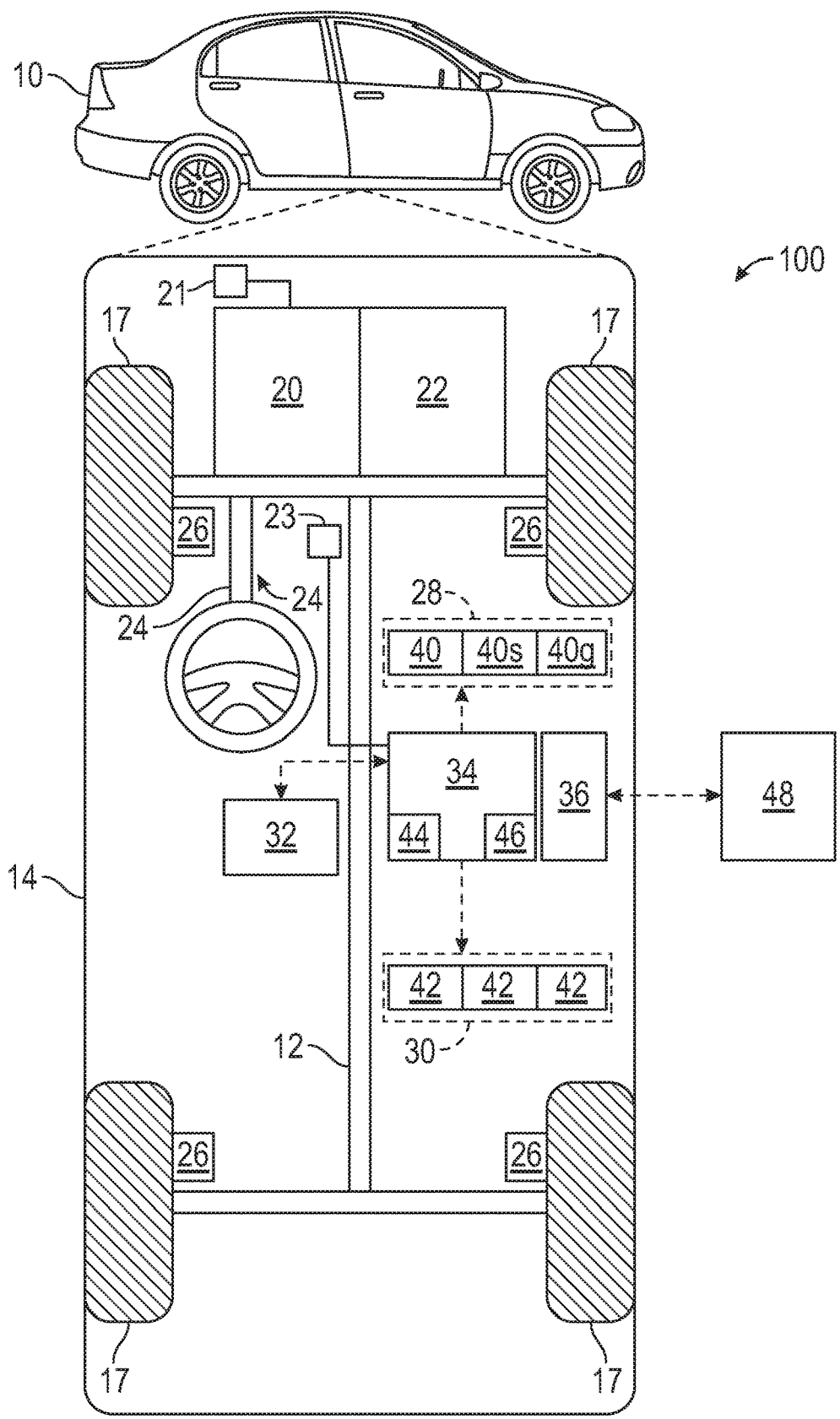
FIG. 1 is a schematic block diagram of a vehicle.

As depicted in FIG. 1, the vehicle 10 generally includes a chassis 12, a body 14, front and rear wheels 17. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14.

In various embodiments, the vehicle 10 may be an autonomous vehicle and a control system 100 is incorporated into the vehicle 10. The vehicle 10 is, for example, a vehicle that is automatically controlled to carry passengers from one location to another. The vehicle 10 is depicted in the illustrated embodiment as a passenger car, but it should be appreciated that another vehicle including motorcycles, trucks, sport utility vehicles (SUVs), recreational vehicles (RVs), marine vessels, aircraft, etc., can also be used. In an exemplary embodiment, the vehicle 10 is a so-called Level Four or Level Five automation system. A Level Four system indicates "high automation", referring to the driving mode-specific performance by an automated driving system of aspects of the dynamic driving task, even if a human driver does not respond appropriately to a request to intervene. A Level Five system indicates "full automation", referring to the full-time performance by an automated driving system of aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17. While depicted as including a steering wheel for illustrative purposes, in some embodiments contemplated within the scope of the present disclosure, the steering system 24 may not include a steering wheel.

The sensor system 28 includes one or more sensing devices 40 (i.e., sensors) that sense observable conditions of the exterior environment and/or the interior environment of the vehicle 10. The sensing devices 40 may include, but are not limited to, radars, lidars, global positioning systems, optical cameras, thermal cameras, ultrasonic sensors, and/or other sensors. The actuator system 30 includes one or more actuator devices 42 (e.g., brake actuators or propulsion actuators) that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered). The sensing system 28 includes one or more Global Positioning System (GPS) transceiver 40g configured to detect and monitor the route data (i.e., route information). The GPS transceiver 40g is configured to communicate with a GPS to locate the position of the vehicle 10 in the globe. The GPS transceiver 40g is in electronic communication with the controller 34.

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer non-transitory readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of known memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 100. The vehicle 10 includes a user interface 23, which may be a touchscreen in the dashboard. The user interface 23 is in electronic communication with the controller 34 and is configured to receive inputs by a user (e.g., vehicle operator). Accordingly, the controller 34 is configured to receive inputs from the user via the user interface 23. The user interface 23 includes a display configured to display information to the user (e.g., vehicle operator or passenger).

The communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

FIG. 1 is a schematic block diagram of the control system 100, which is configured to control the vehicle 10. The controller 34 of the control system 100 is in electronic communication with the braking system 26, the propulsion system 20, and the sensor system 28. The braking system 26 includes one or more brake actuators (e.g., brake calipers) coupled to one or more wheels 18. Upon actuation, the brake actuators apply braking pressure on one or more wheels 17 to decelerate the vehicle 10. The propulsion system 20 includes one or more propulsion actuators for controlling the propulsion of the vehicle 10. For example, as discussed above, the propulsion system 20 may include internal combustion engine and, in that case, the propulsion actuator may be a throttle specially configured to control the airflow in the internal combustion engine. The sensor system 28 may include one or more accelerometers (or one or more gyroscopes) coupled to one or more wheel 17. The accelerometer is in electronic communication with the controller 34, and is configured to measure and monitor the longitudinal and lateral accelerations of the vehicle 10. The sensor system 28 may include one or more speed sensors 40s configured to measure the speed (or velocity) of the vehicle 10. The speed sensor 40s coupled to the controller 34 and is in electronic communication with one or more wheels 17.

FIG. 2 is a block diagram of a method 200 for controlling the vehicle 100 in order to enable user driven and feature selection. The method 200 includes block 202, which entails transmitting, by GPS transceiver 40g, route data or route information to the controller 34. The route data is continuously updated while the vehicle 10 is moving. In other words, the GPS transceiver 40g continuously monitors the location of the vehicle 10 and therefore the route of the vehicle 10. Accordingly, the GPS transceiver 40g transmits route data to the controller 34. At block 204, the controller 34 continuously receives route data from the GPS transceiver 40g in order to determine the location of the vehicle 10. At block 206, the controller 34 receives the feature data from the sensor system 28. The feature data (e.g., feature information) is information about the plurality of features needed for each of the plurality of vehicle operating modes. The plurality of features includes, but not limited to, object detection, sign detection, and surrounding view. The term "feature" means a functionality of the vehicle 10 that allows it to detect, using the sensor system 28, its surroundings or characteristics about its operation relative to external objects (e.g., distance from the vehicle 10 to another vehicle). The controller 34 includes an intelligent range management system (e.g., software) to determine the range of the vehicle 10 as a function of the state of charge (SOC) of the battery 23. The term "range" means the distance that the vehicle 10 is capable of moving solely using the electric motor (which may be part of the propulsion system 20) for propulsion. After determining the range of the vehicle 10 for each vehicle operating mode based on the route data and the feature data, the controller 34 sends the list LST of range-mode combinations to the user interface 23 at block 208. The predicted range may be calculated using the following equation:

$$R_{pred} = \frac{P_{cur} \times d_s}{P_{cost}}$$

where:
$R_{pred}$ is the predicted range;
$P_{cur}$ is the residual power on the battery (or state of charge of the battery 23); and
$d_s$ is the past driving distance.

As shown in FIG. 3, the list LST of range-mode combinations includes the plurality of ranges R for each of the plurality of vehicle operating modes VOM as shown in FIG. 3. The vehicle operating modes VOM may be characterized as the automation levels as set forth by the Society of Automotive Engineers (SAE) J 3016-2018 standard, namely: Level 0 (i.e., L0)—no automation; Level 1 (i.e., L1)—driver assistance; Level 2 (i.e., L2)—partially automation; Level 3 (i.e., L3)—conditional automation; Level 3 (i.e., L3)—high automation; and Level 4 (i.e., L4)—full automation. The list LST of range-mode combinations may include a range R and a corresponding vehicle operating mode VOM. Each vehicle operating mode VOM includes a level of automation (as described above), and a road condition (e.g., highway, urban, and/or freeway).

Returning to FIG. 2, after executing block 208, the method 200 proceeds to block 210. At block 210, the controller 34 commands the user interface 23 to display the list LST of range-mode combinations COMs as shown in FIG. 3. The user may then select the desired range-mode combination of the list LST of range-mode combinations. Then, the selected range-mode combination SCOM is sent to the controller 34 at block 212. The controller 34 then receives the user input (i.e., the selected range-mode combination SCOM) through the user interface 23. The user input is the selection made by the user of the vehicle 10 that is indicative of the selected range-mode combination of the list of range-mode combinations. This selection is required when a new trip starts or a route situation changes (e.g., traffic, construction, accident, etc.) The selected range-mode combination SCOM includes a selected range SR and a selected vehicle operating mode SVOM. Then, the method 200 proceeds to block 214. At block 214, the controller 34, using the intelligent range management system (e.g., software), (1) deactivates units that are irrelevant (not used) for the selected vehicle operating mode in response to receiving the user input through the user interface to minimize usage of computational resources of the vehicle 10; and (2) adjusts the power supply of at least one of the units that are relevant to the selected vehicle operating mode SVOM to minimize power consumption as discussed in detail below.

Figure 4:
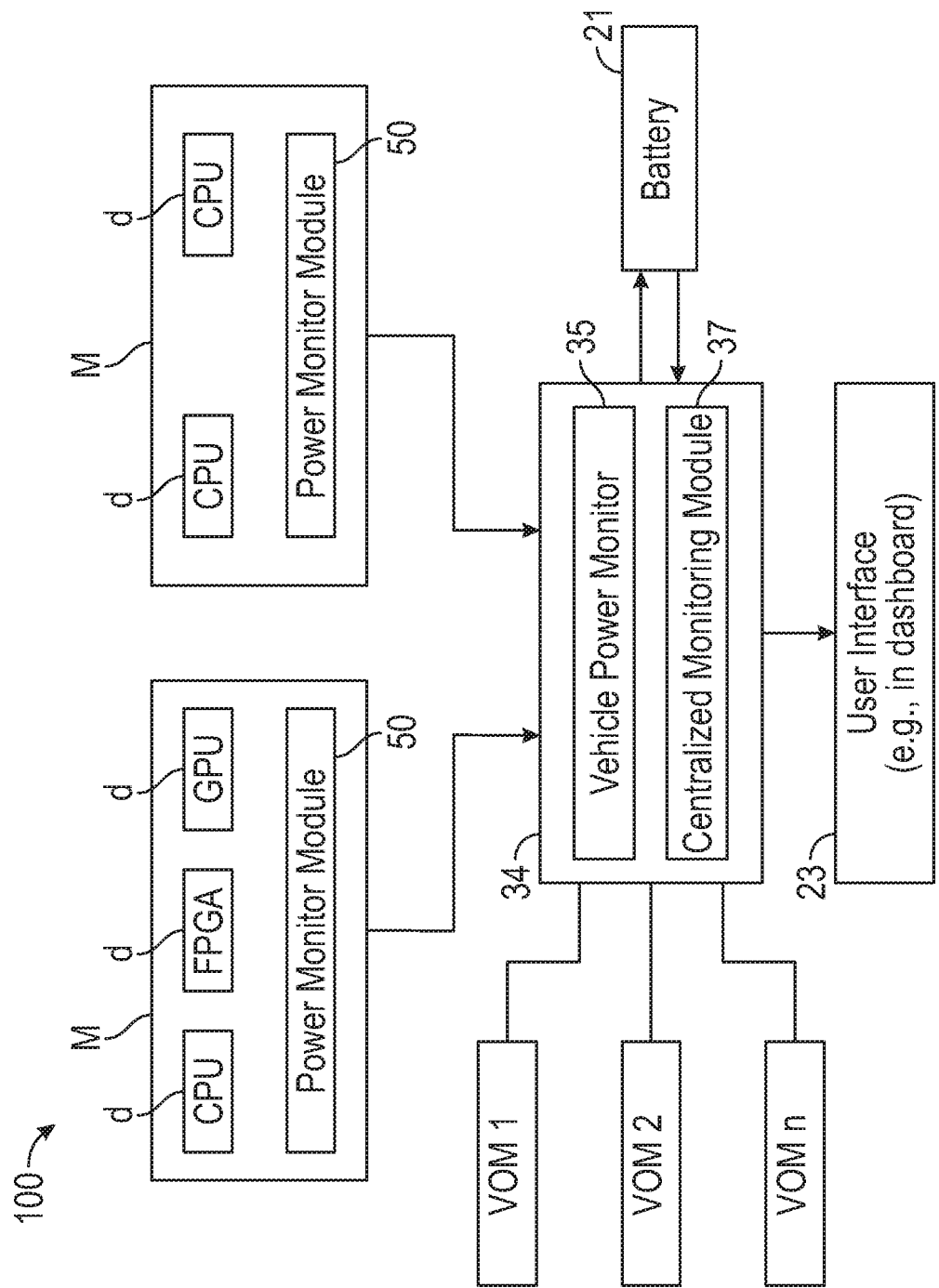
FIG. 4 is a schematic block diagram of part of the control system of the vehicle of FIG. 1, which serves as a system to enable user driven range and feature selection.

With reference to FIG. 4, the control system 100 may additionally include a plurality of modules M for enabling the features. Each module M includes a plurality of units or devices d. In the present disclosure, the term "device" means an electric hardware component that consumes electric power. The devices d may include, among other things, a central processing unit (CPU), a graphics processing unit (GPU), a field-programmable gate array (FPGA), and/or a combination thereof. For example, one module M may include a CPU, FPGA, and a GPU, and another module M may include two CPUs. While the depicted embodiment is shown with two modules M, it is envisioned that the control system 100 may include more or fewer modules M. Each module M includes a power monitor module 50 (e.g., hardware and/or software) configured to monitor the power consumption of each device d in the module M. Each module M is in electric communication with the controller 34. Accordingly, each module M is programmed to send power metrics to the controller 34. Accordingly, the controller 34 receives data from each module M relating to the electric power consumption of each module M and each device d in each module M. The control system 100 could be a distributed system or a centralized system. It is desirable that the control system 100 be a centralized system to avoid complexity in the message passing scheme. No new physical module is needed.

With continuing reference to FIG. 4, the controller 34 includes a vehicle power module 35 (which may be hardware or software) configured to determine the electric power consumption of the vehicle 10 and a centralized monitoring module 37 configured to receive all the power metrics from the modules M and the vehicle 10 and uses those power metrics to determine the range of the vehicle 10 for each vehicle operations mode. The controller 34 is also programmed to create a list LST of range-mode combinations. The controller 34 is in electronic communication with the battery 21. Accordingly, the battery 21 may communicate its state of charge (SOC) to the controller 34. The controller 34 is programmed to determine the range of the vehicle 10 as a function of the SOC of the battery 21. The controller 34 may command the battery 21 to supply electric power to the propulsion system 20 (e.g., electric motor) more efficiently. The controller 34 is in electronic communication with the user interface 23 and is programmed to command the user interface 23 to display the list LST of range-mode combinations. The user then selects one of the range-mode combinations from the list LST. The controller 34 is therefore programmed to receive the user input (i.e., the selected range-mode combination). In response to receiving the user input (i.e., the selected range-mode combination), the controller 34 selects and enables the selected vehicle operating mode SVOM. Also, in response to receiving the user input (i.e., the selected range-mode combination), the controller 34 enables solely the devices d (i.e., units) that are relevant to the selected vehicle operating mode SVOM. The devices d therefore include irrelevant devices and relevant devices for each vehicle operating mode. The irrelevant devices do not need to be active to enable a respective vehicle operating mode and, the relevant devices need to be active to enable the respective vehicle operating mode. Thus, in response to the user input, the controller 34 deactivates the irrelevant devices for the selected vehicle operating mode SVOM and activates solely the relevant devices for the selected vehicle operating mode SVOM.

Figure 5:
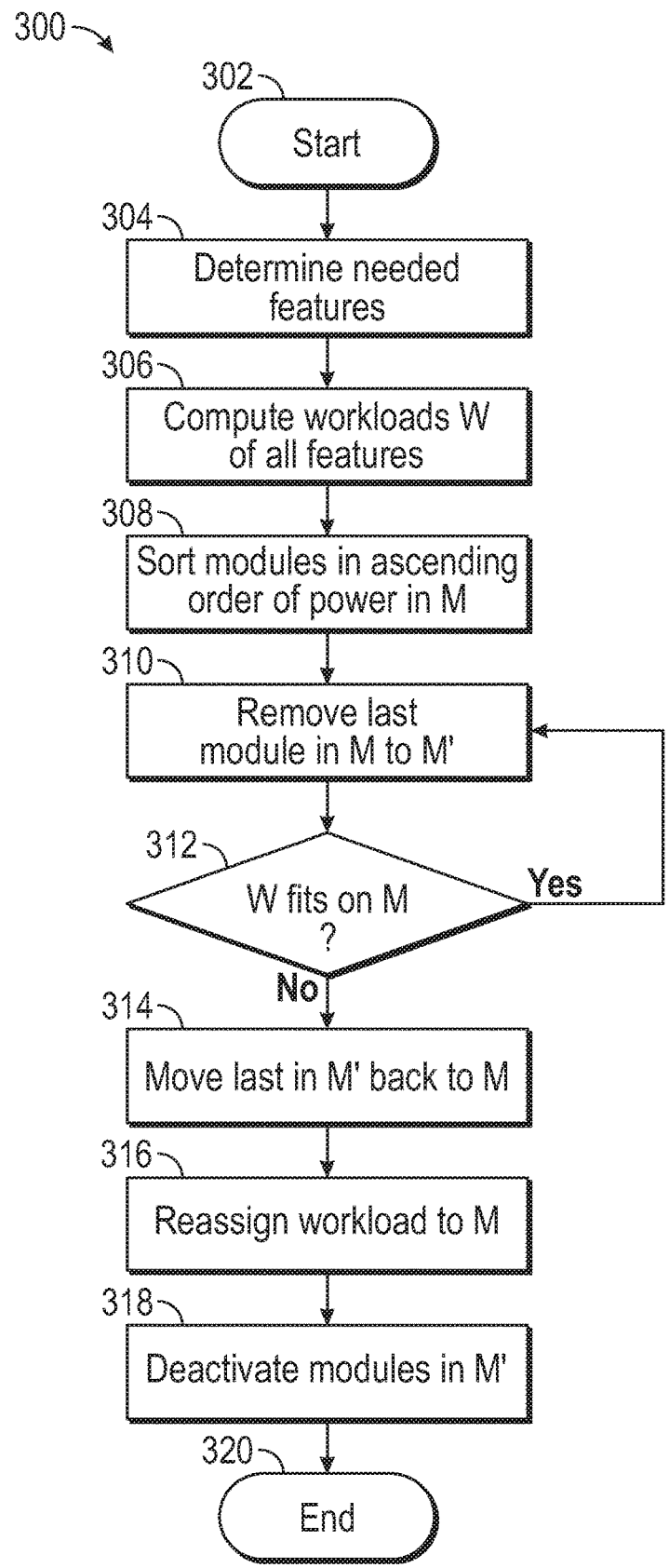
FIG. 5 is a flowchart of a method for determining activation and deactivation of devices of the vehicle in response to a user input.

FIG. 5 is a flowchart of a method 300 for determining activation and deactivation of devices d in view of the selected vehicle operating mode SVOM. By executing this method 300, the controller 34 uses the minimum number of devices d when there are sufficient computational resources to enable the features that correspond with the selected vehicle operating mode SVOM. The method 300 begins at start block 302 upon receipt of a user input. In other words, the controller 34 begins executing method 300 in response to receiving a user input that is indicative of the selected range-mode combination SCOM. Then, the method 300 proceeds to block 304. At block 304, the controller 34 determines the features needed to enable the selected vehicle operating mode SVOM. Each vehicle operating mode (e.g., level of automation) requires specific features, such as object detection, sign detection, surrounding view, etc. Such feature requirement in view of the vehicle operating mode VOM is stored on the controller 34. After determining the features needed for the selected vehicle operating mode SVOM, the method 300 proceeds to block 306. The controller 34 computes the workloads W of all the features needed for the selected vehicle operating mode SVOM. For each needed feature, the controller 34 profiles and stores the workload on each required computational resource (i.e., device d), such as the CPU, GPU, FPGA, and memory mem. The workloads W are profiled under the maximum resource capacity (i.e., highest frequency). The controller 34 stores these profiles in a Resource Demand Table (RDT) as shown in FIG. 6. After block 308, the method 300 proceeds to block 308.

At block 308, the controller 34 sorts the modules M in ascending order of power consumption in M. The next steps of the method 300 are used to determine the which modules M should be activated and which modules M should be deactivated to minimize power consumption. After block 308, the method 300 proceeds to block 310. At block 310, the controller 34 removes the last module in the sorted list of modules M (as created in block 308) and places it in a list of deactivated modules M'. Then, the method 300 proceeds to block 312. At block 312, the controller 34 determines whether the workload W fits on the list of modules M. If the workload W fits on the modules M, then the method 300 returns to block 310. If the workload W does not fit on the modules M, then the method 300 continues to block 314. At block 314, the last module in the list of deactivated modules M' is moved back to the list of active modules M. Then, the method 300 proceeds to block 316. At block 316, the controller 34 reassigns the workload W to the active modules M. Then, the method 300 continues to block 318. At block 318, the modules that are in the list of deactivate modules M' are deactivated. After block 318, the method 300 ends at block 320. By executing this method 300, the controller 34 determines the minimum number of modules M with sufficient resources to enable the selected vehicle operating mode SVOM by using the following equations:

$$N = \min\|M\| : M\{M_i\}$$

$$\sum_{f \in feature} U(d) \le \sum_{i=1}^{N} M_i(d) : d \in \{cpu, gpu, fpga, mem\}$$

where:

f is a set of features required for a corresponding vehicle operating mode.

N represents the minimum number of modules needed for a corresponding feature f.

M is the set of all modules.

d represents devices inside a module. Each module includes a set of devices d.

U is a computing workload (in the form of utilization, for example) that feature f introduced on device d.

A tie is broken with the device power consumption at full power.

Figure 7:
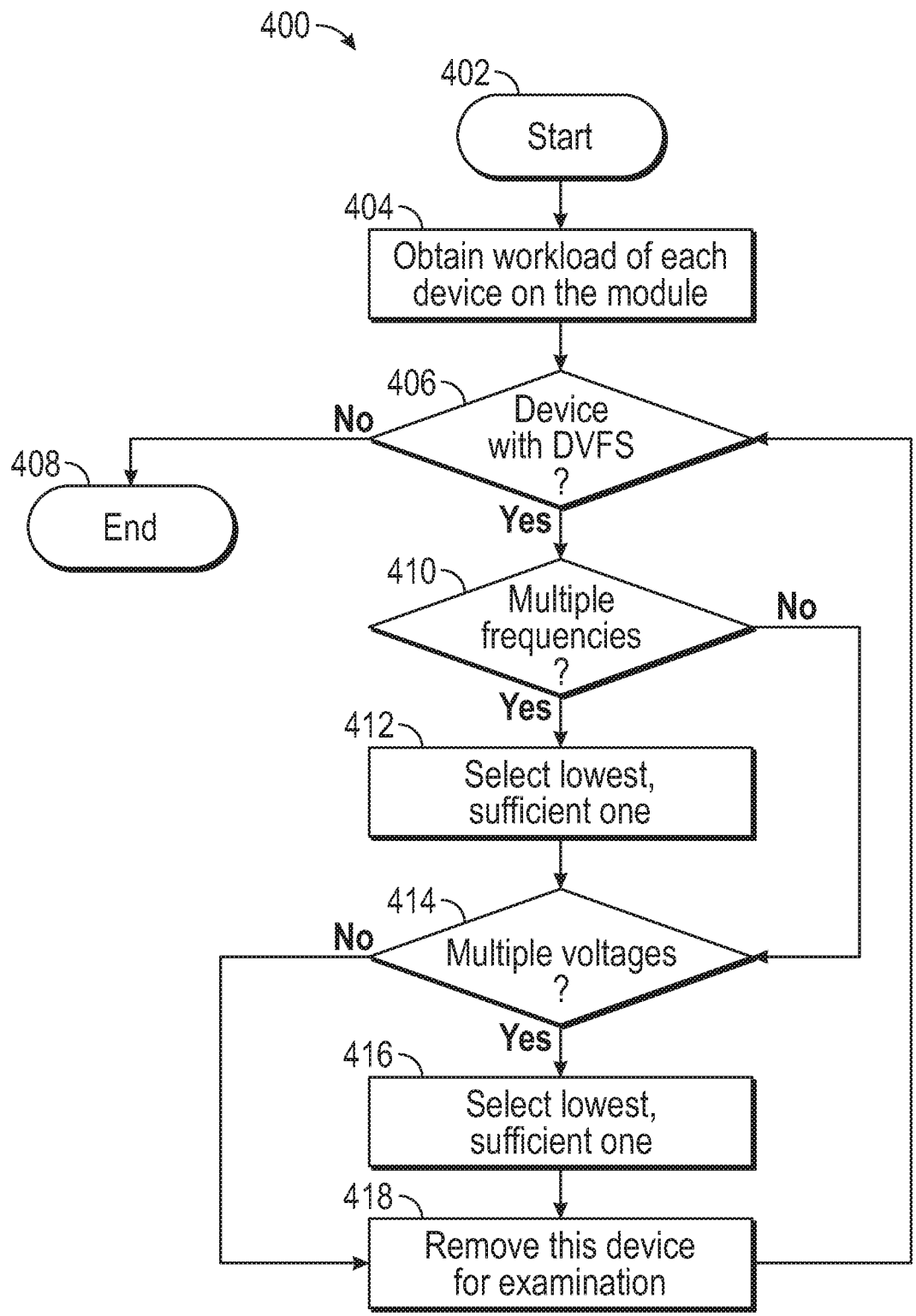
FIG. 7 is a flowchart of a method for adjusting the power supply for each module.

FIG. 7 is a flowchart of a method 400 for adjusting the power supply for each module M. In this method 400, the controller 34 reduces the power consumption of the modules M through lower frequency of a device d (e.g., CPU, GPU, FPGA, memory, etc.) when the workload on a module M does not require full capacity. The method 400 begins at start block 402. Then, the method 400 proceeds to block 404. At block 404, the controller 34 obtains the workload for each device d on the module M. After block 404, the method 400 proceeds to block 406. The controller 34 determines whether the devices d on the modules M to be activated to enable the selected vehicle operating mode SVOM is equipped with dynamic voltage and frequency scaling (DVFS). If none of the devices d of the modules M to be activated to enable the selected vehicle operating mode SVOM is equipped with DVFS, then the method 400 proceeds to block 408. At block 408, the method 400 ends. If one or more of the devices d of the modules M to be activated to enable the selected vehicle operating mode SVOM, then the method 400 proceeds to block 410. At block 410, the controller 34 determines whether the devices d are capable of functioning at multiple frequencies. If one or more devices d are capable of functioning at multiple frequencies, then the method 400 proceeds to block 412. At block 412, the controller 34 selects the lowest frequency that is sufficient for the computation of each device d. After block 412, the method 400 proceeds to block 414. At block 414, the controller 34 determines if multiple voltages correspond to the frequency. If there are multiple voltages corresponding to the frequency, then the method 400 proceeds to block 416. At block 416, the controller 34 selects the lowest voltage sufficient meeting error rate requirements. The method 400 then proceeds to block 418. At block 418, the controller 34 removes this device d for examination. In this method 400, the workload (i.e., the power consumption) of a module M may be calculated using the following equation:

$$P = C_1 \cdot V^2 + C_2 \cdot F \cdot V^2$$

where:

$C_1$ is a first constant determined by the physical characteristics (e.g., size, material, electrical resistance and capacity, etc.) of the device d.

$C_2$ is a second constant determined by the physical characteristics (e.g., size, material, electrical resistance and capacity, etc.) of the device d.

V is the voltage of the device d.

F is the frequency of the device d.

P is power consumed by a module M.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a vehicle, comprising:
    receiving, by a controller, route data, wherein the route data is continuously updated while the vehicle is moving, and the vehicle includes a plurality of vehicle operating modes;
    receiving, by the controller, feature data, wherein the feature data is information about a plurality of features needed for each of the plurality of vehicle operating modes;
    determining, by the controller, a plurality of ranges for each of the plurality of vehicle operating modes, wherein each of the plurality of ranges is a function of the route data and the feature data for each of the plurality of vehicle operating modes;
    commanding, by the controller, a user interface to display a list of range-mode combinations, wherein the list of range-mode combinations includes the plurality of ranges for each of the plurality of vehicle operating modes; and
    receiving, by the controller, a user input through the user interface, wherein the user input is a selection made by a user of the vehicle that is indicative of a selected range-mode combination of the list of range-mode combinations, and the selected range-mode combination includes a selected range and a selected vehicle operating mode;
    wherein the controller is part of a control system, the control system includes a plurality of devices, each of the plurality of devices is an electric hardware component that consumes electric power, the plurality of devices is selected from a group consisting of a central processing unit, a graphics processing unit, and a field-programmable gate array, the plurality of devices includes a plurality of irrelevant devices and a plurality of relevant devices for each of the plurality of vehicle operating modes, the plurality of irrelevant devices do not need to be active for a respective one of the plurality of vehicle operating modes, and the plurality of relevant devices needs to be active for the respective one of the plurality of vehicle operating modes.

2. The method of claim 1, further comprising deactivating, by the controller, the plurality of irrelevant devices for the selected vehicle operating mode in response to receiving the user input through the user interface to minimize usage of computational resources of the vehicle.

3. The method of claim 2, further comprising determining, by the controller, the plurality of irrelevant devices for the selected vehicle operating mode before deactivating the plurality of irrelevant devices.

4. The method of claim 3, further comprising adjusting a power supply of at least one of the plurality of relevant devices for the selected vehicle operating mode to minimize power consumption in response to receiving the user input through the user interface to minimize power consumption.

5. The method of claim 4, wherein deactivating a plurality of irrelevant devices includes deactivating modules, each of the modules includes the plurality of devices, and the method further includes determining which modules to deactivate using the following equations:

$$N = \min \|M\| : M\{M_i\}$$

$$\sum_{f \in feature} U(d) \leq \sum_{i=1}^{N} M_i(d) : d \in \{cpu, gpu, fpga, mem\}$$

where:

f is a set of features required for the selected vehicle operating mode SVOM

N represents a minimum number of modules needed for a feature f needed to enable the selected vehicle operating mode SVOM M is a set of all modules d represents devices inside one of the modules U is a computing workload that the feature f introduced on device d.

6. The method of claim 5, wherein a power consumption of each module is calculated using the following equation:

$$P = C_1 \cdot V^2 + C_2 \cdot F \cdot V^2$$

where:

$C_1$ is a first constant determined by physical characteristics of a device d $C_2$ is a second constant determined by physical characteristics of the device d V is a voltage of the device d F is a frequency of the device d P is power consumed by a module M.

7. A vehicle, comprising:

a control system including a controller;

a sensor system in electric communication with the controller, wherein the sensor system includes a plurality of sensor devices, and the plurality of sensor devices includes an optical camera and Global Positioning System (GPS) transceiver;

a user interface configured to receive user inputs;

wherein the controller is programmed to:

receive route data, wherein the route data is continuously updated while the vehicle is moving, and the vehicle includes a plurality of vehicle operating modes;

receive feature data, wherein the feature data is information about a plurality of features needed for each of the plurality of vehicle operating modes;

determine a plurality of ranges for each of the plurality of vehicle operating modes, wherein each of the plurality of ranges is a function of the route data and the feature data for each of the plurality of vehicle operating modes;

command a user interface to display a list of range-mode combinations, wherein the list of range-mode combinations includes the plurality of ranges for each of the plurality of vehicle operating modes;

wherein the controller is programmed to receive a user input through the user interface, the user input is a selection made by a user of the vehicle that is indicative of a selected range-mode combination of the list of range-mode combinations, and the selected range-mode combination includes a selected range and a selected vehicle operating mode;

wherein the control system includes a plurality of devices, each of the plurality of devices is an electric hardware component that consumes electric power, the plurality of devices is selected from a group consisting of a central processing unit, a graphics processing unit, and a field-programmable gate array, the plurality of devices includes a plurality of irrelevant devices and a plurality of relevant devices for each of the plurality of vehicle operating modes, the plurality of irrelevant devices do not need to be active for a respective one of the plurality of vehicle operating modes, and the plurality of relevant devices need to be active for the respective one of the plurality of vehicle operating modes.

8. The vehicle of claim 7, wherein the controller is programmed to deactivate the plurality of irrelevant devices for the selected vehicle operating mode in response to receiving the user input through the user interface to minimize usage of computational resources of the vehicle.

9. The vehicle of claim 8, wherein the controller is programmed to determine the plurality of irrelevant devices for the selected vehicle operating mode before deactivating the plurality of irrelevant devices.

10. The vehicle of claim 9, wherein each of the plurality of vehicle operating modes includes an automation level as defined under a Society of Automotive Engineers (SAE) J 3016-2018 standard.

11. The vehicle of claim 10, wherein the controller is programmed to adjust a power supply of at least one of the plurality of relevant devices for the selected vehicle operating mode to minimize power consumption in response to receiving the user input through the user interface to minimize power consumption.

12. The vehicle of claim 11, wherein the controller is programmed to deactivate the plurality of irrelevant devices by deactivating modules, each of the modules includes the plurality of devices, and the controller is further programmed to determine which modules to deactivate using the following equations:

$$N = \min\|M\| : M\{M_i\}$$

$$\sum_{f \in feature} U(d) \leq \sum_{i=1}^{N} M_i(d) : d \in \{cpu, gpu, fpga, mem\}$$

where:

f is a set of features required for the selected vehicle operating mode SVOM

N represents a minimum number of modules needed for a feature f needed to enable the selected vehicle operating mode SVOM M is a set of all modules d represents devices inside one of the module M U is a computing workload that the feature f introduced on device d.

13. The vehicle of claim 12, wherein a power consumption of each module is calculated using the following equation:

$$P = C_1 \cdot V^2 + C_2 \cdot F \cdot V^2$$

where:

$C_1$ is a first constant determined by physical characteristics of the device d $C_2$ is a second constant determined by physical characteristics of the device d V is a voltage of the device d F is a frequency of the device d P is power consumed by a module M.

* * * * *